United States Patent [19]

Smothers

[11] Patent Number: 5,087,982
[45] Date of Patent: Feb. 11, 1992

[54] PULSED COMMUNICATION SYSTEM

[75] Inventor: Steven W. Smothers, Marion, Iowa

[73] Assignee: Inter Innovation LeFebure Manufacturing, Cedar Rapids, Iowa

[21] Appl. No.: 613,092

[22] Filed: Nov. 14, 1990

[51] Int. Cl.$^5$ .............................................. H04J 14/08
[52] U.S. Cl. ..................................... 359/137; 359/172; 359/186
[58] Field of Search .................. 370/1, 4, 3; 455/601, 455/603, 606, 607, 608, 617, 618, 619; 359/137, 172–186

[56] References Cited

U.S. PATENT DOCUMENTS

| | | | |
|---|---|---|---|
| 3,899,430 | 8/1975 | Ancker-Johnson | 370/4 |
| 4,393,515 | 7/1983 | De Neumann | 455/608 |
| 4,402,090 | 8/1983 | Gfeller et al. | 455/603 |
| 4,543,665 | 9/1985 | Sotelo et al. | 455/602 |
| 4,682,323 | 7/1987 | Corfield et al. | 455/602 |
| 4,727,600 | 2/1988 | Avakian | 455/607 |
| 4,809,257 | 2/1989 | Gantenbein | 455/607 |
| 4,882,770 | 11/1989 | Miyahira et al. | 455/603 |

FOREIGN PATENT DOCUMENTS 2823931A 12/1979 Fed. Rep. of Germany.
2079088A 7/1980 United Kingdom.

OTHER PUBLICATIONS

Dual Channel Infrared Optical Wireless Drive Thru System, HM Electronics, Inc., 5/90.

Primary Examiner—Edward L. Coles, Sr.
Assistant Examiner—L. Pascal
Attorney, Agent, or Firm—Simmons, Perrine, Albright & Ellwood

[57] ABSTRACT

An optical communication system includes a stationary master unit which is adapted to receive through a wired communication bus a plurality of separate communication input signals and communicate a corresponding plurality of separate communication output signals. The master unit converts the input signals to pulsed signals and optically transmits the pulsed signals corresponding to each of the separate signals during designated time slots to one of a plurality of separate communication units which preferably are portable units. The portable units reconvert the received pulsed signals to signals corresponding to the original communication signals. Each of the portable units also receives individually separate communication signals, converts the received communication signals to pulsed signals and optically transmits the pulsed signals to the master unit in the same manner. The master unit converts the received pulsed signals to communication output signals and communicates them over the bus to a designated output terminal. Range extending units may be coupled to the master unit. The disclosed optical system is particularly adaptable to improve existing communication systems at drive-up windows of banks or similar installations.

19 Claims, 8 Drawing Sheets

PULSED COMMUNICATION SYSTEM

BACKGROUND OF THE INVENTION

1. Field of the Invention

The invention relates generally to communication systems and more particularly to optical wireless communication systems.

2. Discussion of the Prior Art

Typically, communication systems are based on radio frequency type carrier waves. The carrier waves may transmit predetermined signals, such as voice signals or data signals, by typical modulation of the carrier waves in accordance with patterns indicative of the information. At the receiving terminal, the modulated signals are demodulated, hence separated from the carrier frequency and assume a desired signal identity. The demodulated signals may, for example, become transduced into humanly discernible information, such as voice frequency signals which may be transduced through audio speakers or earphones. In the case of of data signals, the information may be transmitted to a data processing system, or the transmitted information may possibly be displayed on a viewing screen. Both amplitude and frequency modulations are well known to communicate information by radio frequency transmitters. For low cost, local communication systems, costs relating to licensing procedures as required by governmental agencies, and particularly the cost of adherence to strict standards established by the Federal Communications Commission has caused system designers to seek out alternatives to well known radio frequency transmitters. One recognized alternative mode of communication, particularly on local levels, seeks to employ light waves as carrier medium for communication systems. In the recent past, short range communications systems have been developed which are based on optical carrier waves for transmitting communications.

An advantage of optical communication systems lies of course in the avoidance of strict standards and requirements established for radio frequency communications systems, thereby allowing more freedom of design to meet cost and operational requirements. Another advantage lies in the absence of interference from radio transmissions. On the other hand, at least one disadvantage of optical communication systems has been realized in difficulties of conveniently achieving a true duplex mode of operation. For two way communication between two communicating parties, a duplex mode is a desired mode, in contrast to a non-duplex transmission mode in which communication is restricted to only a single direction at one time. Non-duplex modes of communication typically require push-to-talk switches which, when released after a communication in one direction, frees the communication channel to permit it to be used by another communicator. A duplex mode might be established with dual operating frequencies. In prior optical systems, providing two separate operating frequencies necessitated the duplication of both transmitting and receiving elements, each operating at different frequencies. With the current state of the art, the duplication of all optical components for a multi-channel system is not appropriate. So-called High-Q filters for optical systems are complex and expensive to implement.

Another problem which uniquely plagues optical communication is known in the art as leakage. Leakage is the result of interference by transmitters picked up by adjacent receivers. Since optical communications are based on light waves, unless such a system operates in total light isolation, the risk of leakage or interference from other local systems or from generally present light levels is real. In essence, leakage is noise that reduces relative signal strength of actual information transmissions. It is well known that poor transmission efficiency increases power requirements for information transmission with correspondingly decreased utility in portable systems which need to have their battery packs recharged or replaced more frequently.

The prior art has applied time division principles for transmitting from remote units to a base unit in a first time slot and for transmitting signals from the base unit to the remote units in a second time slot. The base station and each of the remote units include a first oscillator for modulating an audio or voice frequency on a first subcarrier frequency and another oscillator for modulating the subcarrier frequency on a predetermined optical infrared carrier frequency. Currently known time division systems have limitations predicated on state-of-the-art turn-on and turn-off response times of optical transmitters and receivers. The number of channels useful without interference have consequently been limited, and push to talk switches and communication feed-back to indicate the use of a channel may need to be employed to prevent undesirable leakage. In a known system, the base station includes, for example, an optical emitter for repeating the message content of optical messages received from any of the remote units to all of the remote units at the optical carrier frequency. A repetition to a number of slave units of a message received by a master unit may be undesirable in a system in which separate communications are expected to be carried on simultaneously. Hence, the referred-to system does not appear to lend itself to be used for such latter operation.

SUMMARY OF THE INVENTION

The present invention addresses problems found in state-of-the-art optical communication systems and provides an optical communication system in which a plurality of slave or remote optical communication units may simultaneously communicate in separate optical communications to common receiver and transmitter elements of a common master unit.

Within the scope of the invention it is contemplated to provide an optical communication system in which a number of individual operators of portable optical communication units may simultaneously communicate in separate communications via optical transmissions to a single optical master unit system, to which a number of individually addressed customer stations may be directly coupled.

It is also contemplated to provide an optical master unit system including a master unit and at least one remotely located satellite unit which is electrically coupled to the master unit to extend the transmission and receiving ranges of the master unit.

It is further contemplated to provide an optical communication system which separates a plurality of optical communications by a plurality of electrically gated and sequentially separated transmission and reception intervals.

Other features and advantages of the invention will become apparent from the detailed description of the invention in reference to a preferred embodiment thereof.

BRIEF DESCRIPTION OF THE DRAWINGS

The description of a particular embodiment of the invention may be best understood when the detailed description is read in reference to the appended drawings wherein.

DETAILED DESCRIPTION OF THE INVENTION

The Communication System

Figure 1:
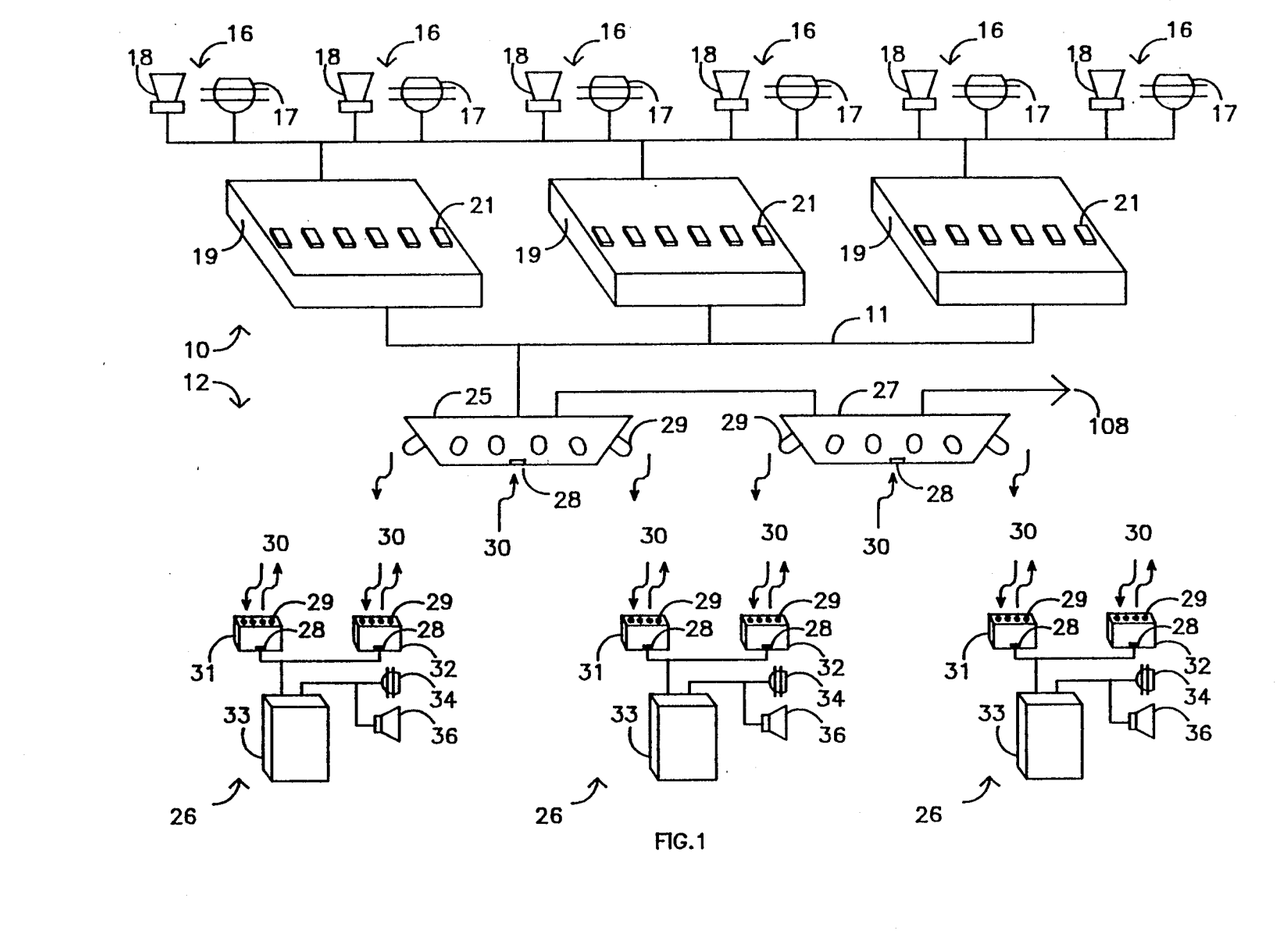
FIG. 1 shows schematically simplified a overall view of a multi-station communication system including an optical communication system in accordance with the present invention.

FIG. 1 shows a typical communication system designated generally by the numeral 10, which system is coupled by a bus 11 to an optical communication system 12 in accordance with the present invention. The communication system 10 as improved by the optical system 12 is in a preferred embodiment an existing bank teller communication system typically used for drive-up windows, in which a teller may communicate with any of a number of drive-up stations. The disclosure consequently refers specifically to the bank teller communication system and describes the features of the invention in relation to the bank teller system. It should, however, be clear that the features of the invention discussed herein have much broader application to various communication systems, not only in banking operations, which are now in existence or which may be implemented in the future. The communication system 10 in FIG. 1 is shown to communicate with six remote stations 16, typically drive-up stations, each equipped with a microphone 17 and a speaker 18. The drive-up stations 16 are typically hard-wired to three teller consoles 19. A bank of pushbuttons or switches 21 allows a teller to selectively establish communication with any one of the six drive-up stations 16. Respective microphones and speakers (not shown) which would normally be coupled to each of the consoles 19 and which normally permit communication with the selected one of the drive-up stations 16 are disconnected and are replaced with the optical communication system 12 as further described herein.

The bus 11 is in the preferred embodiment a hard-wired communication link which communicatively extends the existing electrical couplings from the disconnected speakers and microphones of each of the consoles 19 as respective communication connections 23 and 24 (shown in FIG. 2) to an interface of a master unit 25 of the optical system 12. The communication input connection 23 may originate typically from any of the microphones 17, as relayed over one of the three consoles 19, as shown in FIG. 1. The communication output connection 24 typically would be directed, again via a respective one of the consoles 19, to a respective one of the speakers 18. The optical system 12 contemplates bi-directional pulsed communications between the master unit 25 and a number of individual units 26 which operate synchronously with the master unit 25. The invention is illustrated with a preferred implementation based on the optical system 12 which contemplates communication between three such individual units which are desirably portable units 26 and the master unit 25. It should be kept in mind that optical communications are line-of-sight communications. Physical particulars of an office building, such as pillars or wall partitions may inhibit communications of three portable units 26 and a single master unit 25. The invention contemplates in a particular embodiment a range extension system of the master unit 25 by which a number of extension units, such as an extension unit 27 may be coupled to the master unit 25 and extended in series to eliminate "blind spots" of communications and to extend the range of the master unit 25 as needed. Such range extensions may even permit communications from secure, inner areas of a bank, such as from vaults. The extension units 27 function as slave units to the master unit 25, such that the master unit 25 and at least one of the extension units 27 coupled to the master unit 25 function in unison as a master unit system. It should be realized, however, that the extension units 27 are not deemed to be necessary elements for the described optical system 12 to be operational.

FIG. 1 is a schematic representation of the communication systems 10 and 12, thus, physical positions of the individual elements of one system do not relate to the other. The master unit 25 is preferably mounted to the ceiling of a room within which the teller consoles 19 are located. An advantage of the current system is that tellers may remain in communication with a customer using a particular drive-up station 16, even though the tellers may temporarily turn or move away from the teller station or console 19, as may be required in performing various requested services to particular drive-up customers. The advantage of such continuous communication is that the teller can receive questions from the customer, even though the teller has already begun to process the transaction. Or, a question regarding an endorsement of a check may need to be answered while the teller has turned away from the console 19.

Photoelectric receivers or photosensors, such as photo diodes 28 may have a limited incident angle through which light may be received. More significantly, however, light emitting diodes (LEDs) 29 typically transmit with sufficient intensity only over a specified angle. FIG. 1 shows LEDs 29 which are preferably arranged peripherally about the master unit 25 and also about the extension units 27 to allow communicative transmissions and receptions from any angle with respect to the mounted unit. For example, LEDs 29 may effectively radiate light signals in a conical spread of 25 degrees with respect to an optical axis. In the preferred embodiment, the master unit 25 has, for example, ten LEDs 29 arranged at an angular spacing of thirty-six degrees, such that there may be up to seven degrees overlap of the field of transmission between two adjacent LEDs.

Positioning the receiving and transmitting elements, such as the photo diodes 28 and LEDs 29 on the individual or portable units 26 is in the preferred embodiment subject to restrictive requirements which need to be further explained. It is of course desirable to maintain under various conditions a continuously functional, flexible communication link 30 between the master unit 25 and the portable units 26. The ceiling mounted master unit 25, having a downwardly directed receiving element 28 and radially outwardly and downwardly directed transmitting elements 29 would naturally communicate most readily vertically in upward and downward direction. The corresponding portable units 26 would consequently most readily be in line-of-sight communication with upward directed, horizontally multi-directional transmitter and receiver elements. However, a head-mounted portable transmitter and receiver unit may not be considered proper for operations in banking institutions and a portable unit carried on the person, rather than on the head of the person, may be preferred. The invention consequently contemplates in a particular embodiment thereof a double transmitter and receiver unit 26. Consequently, each of the portable units 26 depicted schematically simplified in FIG. 1 shows two similar cases 31 and 32, each having its own receiving and transmitting elements 28 and 29. The two cases which may be physically and electrically coupled to common case containing shared electronic functions, including also batteries, as schematically illustrated at 33, may be carried conveniently in any of a number of ways, by clips, or by a simple shoulder harness, such that one of the cases 31 and 32 is located on the front of the person and the other case becomes disposed on the wearer's back. Though none of the cases would likely be carried shoulder high or higher, positioning the cases 31 and 32 in front and behind the wearer, would allow the wearer to remain in contact with the master unit 25 and not lose contact because a turn in which the wearer momentarily becomes interposed between the optical transmission. The common case 33 may conveniently also have attached a communication port for a single communication signal input and output port. The port may be a headset for the wearer, such as a bank teller, the headset being schematically illustrated by the combination of a microphone 34 and a cord with earphones 36. As an alternative, the case 32 might be equipped to support the microphone 34 and the other case 31 may be coupled to the earphones 36. The portable units 26 consequently represent the movable end of the flexible communication link 30 to the console 19 via the master unit 25, the link 30 being schematically illustrated by arrows 30 representing optical transmissions.

The Optical Communication Link

In the preferred embodiment, the optical communication link 30 communicates messages in a time slot multiplex mode. Consequently, separate messages may be carried simultaneously in two direction between the optical master unit 25 and each of the communicating portable units 26. A preferred signal transmission mode across the optical link 30 is a pulsed signal mode. The preferred pulsed signal mode transfers information by discrete pulses of optical energy. The pulsed signal mode is in contrast to a carrier frequency transmission mode in which signals are modulated onto a typical continuous carrier wave of a designated frequency. In the preferred pulsed mode as further described herein, no data pulses, and no carrier waves as such, are transmitted during idle periods. Consequently, during such idle periods, no energy is expended by the portable units 26 of the optical communication system 12 for the transmission of a carrier frequency. Pulse width modulation is advantageouly used to convey substantive information with each pulse transmitted during the respective time slots.

Figure 5:
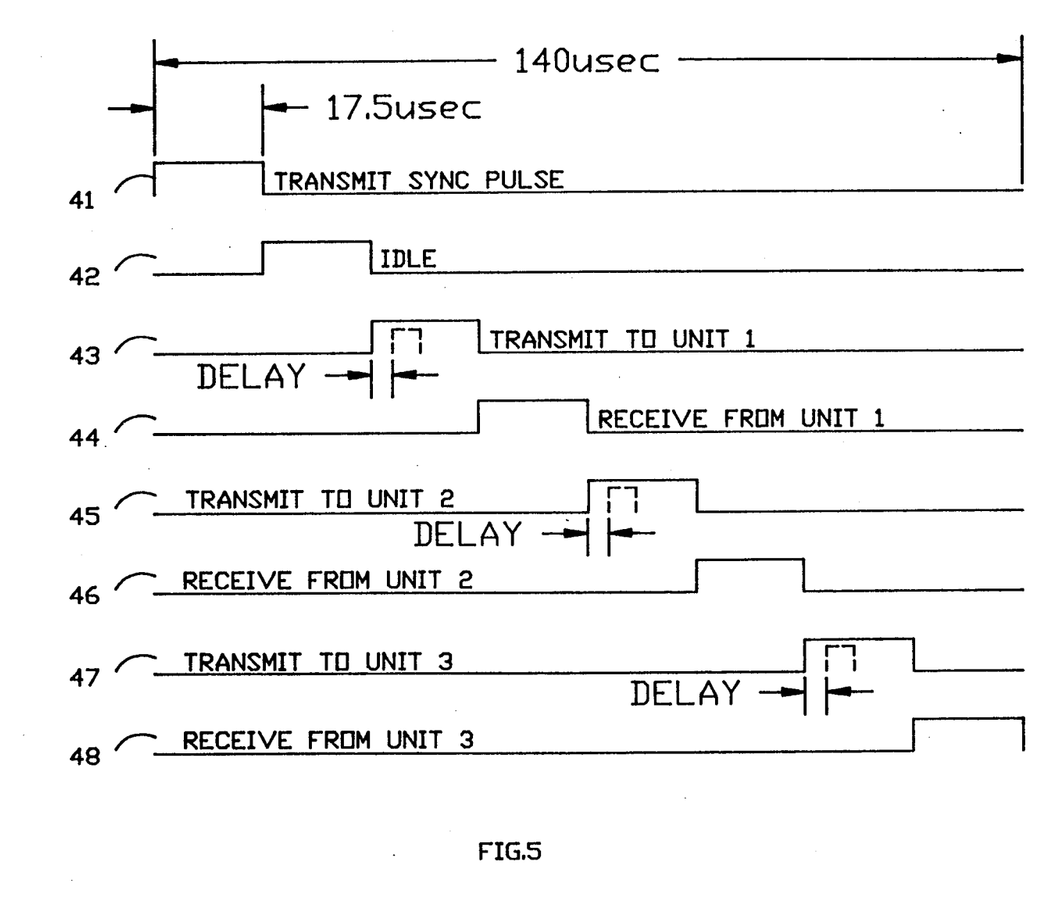
FIG. 5 is a timing diagram of the master unit schematically depicted in FIG. 2.

A preferred cycle of a plurality of sequential time slots is best described with respect to a timing diagram of the master unit 25 as shown in FIG. 5. An upper frequency end of the preferred cycle time is somewhat dictated by the operating speed of photo-electric transducers, such as the photo diodes 28 and the LEDs 29. Desirably there are provided six independent time slots or time channels, such that each of the three portable units 26 in the described preferred embodiment may communicate independently of any of the remaining units 26 with the master unit 25. A cycle time of 140 microseconds has been selected. The cycle time is subdivided into eight equal and consecutive time slots which are shown in the diagram as positive excursions from a steady state idle line. It should be noted that positive excursions merely denote the time slots during which pulses may be transmitted or received. The respective time slots or periods are separately identified in the diagram by the numerals 41 through 48.

The cycle time of 140 microseconds allocates a time slot of 17.5 microseconds to each of the eight time slots 41 through 48. The first time slot 41 of the cycle is reserved for a synchronization pulse ("TRANSMIT SYNC PULSE") which will be generated and transmitted once during each cycle by the master unit 25. In that the cycle of time slots of the master unit 25 is directly coupled to the generation and transmission of the synchronization or sync pulse, the cycle may also be referred to as the master cycle. Desirably, the second time slot 42 is designated as "off time" ("IDLE") and constitutes an idle time or period during which no transmission takes place in either direction. The idle period ma be used by the portable units 26 to effect a reset and synchronization to the master cycle. The remaining time slots 43 through 48 are designated respectively as data time slots for transmitting to a first portable unit 26, receiving from the first portable unit, transmitting to a second portable unit 26, receiving from the second portable unit, transmitting to a third portable unit 26 and receiving from the third portable unit 26 in that particular sequence. The diagram shows representative pulses or pulsed signals occurring within the first or transmission data time slots 43, 45 and 47. The representative pulses show as occurring with a delay away from the leading edge of the respective time slots. Such a delay is preferably implemented to correlate a timed shift in the corresponding, and otherwise synchronous cycles of the respective portable units 26. It should be understood that transmission periods and reception periods for each unit may be reversed or even switched with respect to the particular portable units 26, as will be apparent from the description of the functions of the preferred embodiment, as long as the designated or assigned time slots are correspondingly assigned in the master unit and the portable units. The described order of the data time slots is a preferred order for the particular optical communication system 12. It is conceivable and may become desirable to first transmit to all of the portable units 26 and then to receive from all portable units 26. However, in accordance with the current description, particular advantages ar obtained by alternating the transmit and receive data time slots as described herein. Except for the separate time slots that are allocated to each of the portable units 26 for receiving and transmitting communication signals, the units 26 are in essence identical with each other.

In view of the above, the overall function of the master unit 25 and of the portable units 26 is to convert communications in the form of first type signals, in the preferred example the somewhat erratic analog signals representing human speech, to pulsed optical signals carrying data representative of such first type signals. The corresponding function at the receiving end of the link 30 is to convert such pulsed optical signals back to such first type signals. The first type signals may then be converted by a typical transducer, such as a speaker, into human speech. It is conceivable, to process signals other than those representative of human speech in the manner described herein.

The Master Unit

Figure 2:
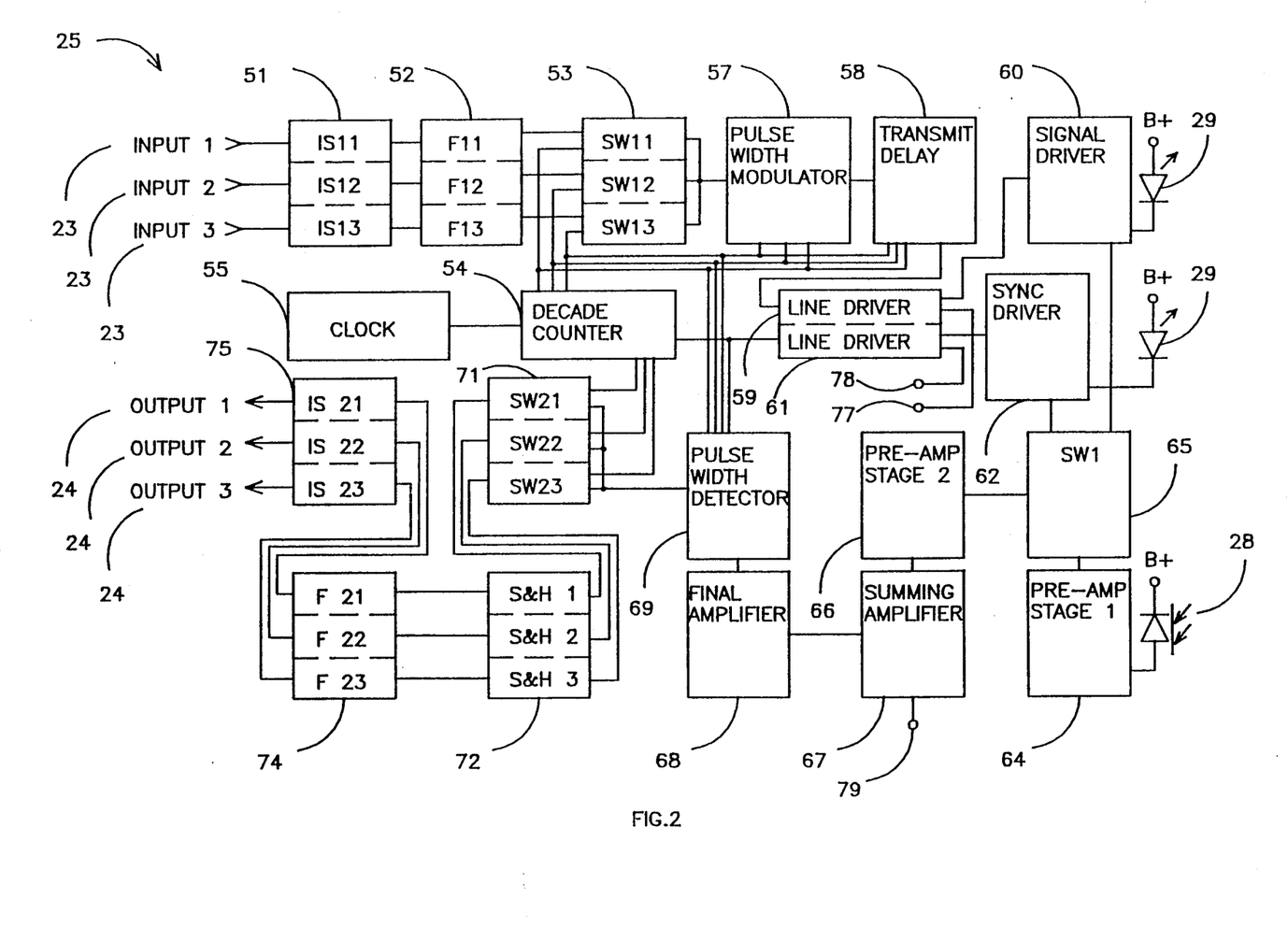
FIG. 2 shows a functional diagram of a master unit of the optical communication system shown in FIG. 1.

In reference to FIG. 2, there is shown a block diagram of functions implemented by the master unit 25. The bus 11 includes, in accordance with the preferred embodiment described herein, as communication input connections 23 three typical pairs of speaker wire which represent the three sets of hard wired communication input connections 23. The input connections 23 are desirably coupled to the master unit 25 through a coupling transformer represented by functional block 51 ("IS 11–13"). The isolation block 51 represents a signal input side of a communication interface including a desired number of input terminals or ports. The interface includes in the preferred example three separate isolation transformers, each coupling one of the three independent inputs which may occur simultaneously. Each coupling transformer isolates one of the steady state input characteristics of an external system from the master unit 25. The isolating transformer consequently allows the optical communication system 12 to be used with different types of hard wired communication systems regardless of bias conditions on such inputs. The output signal from each of the isolation transformers then passes through a typical "high-pass" filter, the three filters being represented by the filter block 52 ("F 11–13") and appears as input signal to a bank 53 of three switches ("SW 11–13"). The switches may be typical solid state switches and are in the preferred embodiment junction field effect transistors or JFETs (2N3822). Each of the switches is normally open, hence in a non-conductive state, and is rendered conductive by a positive voltage input signal applied from an eight bit counter 54 ("8 BIT CNTR") which is driven by a system clock 55 ("CL"), the clock pulses of which in combination with the counter 54 establish the described cycle time of 140 microseconds. Each of the switches SW 11, SW 12 and SW 13 of the bank 53 is consequently rendered conductive for a period of 17.5 microseconds during the respective time slots 43, 45 and 47 as shown in FIG. 5. It must be realized that only one of the switches of the bank 53 will be closed at one time, each closure corresponding to one of the referred to time slots. Consequently, electrical equivalents of speech sound waves which are simultaneously received by the master unit 25 are sampled as to their instantaneous value in sequence in accordance with the closure of the switches of the bank 53.

With respect to a simplified frequency spectrum of speech ranging in an acceptable range from three hundred to three thousand Hertz, the transmit frequency for each time slot or channel allows at least one sampling pulse for each positive and negative going oscillation of the high significant speech wave components. Each amplitude of the lower frequency waves may be sampled up to ten or more times during repeated closures of the respective switch of the bank 53. The electrically represented sound signals from the microphones 17 are consequently sequentially applied to a pulse width modulator 57 ("PULSE WIDTH MODULATOR"). The pulse width modulator function converts the voltage amplitude of the respective switched or gated signal to a pulse of a voltage-dependent timed length referred to as width. The timed turn-off may be implemented by a typical comparator amplifier to which a synchronous voltage ramp provides the voltage dependent turn-off time. The pulse width may be chosen, for example, to have a normal pulse length of 5 microseconds with an increase or decrease in length depending on whether the pulse has a positive or negative going amplitude. The pulse width modulator is in essence a pulse signal generator which imparts to each generated pulse the instantaneous value of the sampled communication signal. In the preferred embodiment of the invention, the pulse width modulator 57 is coupled to a signal delay function 58 ("TRANSMIT DELAY") which shifts the transmission of the modulated signal pulse by approximately three microseconds. Thus, a modulated pulse is applied via a typical line driver 59 ("LINE DRIVER") to a signal driver 60 ("SIGNAL DRIVER") during the respective time slot or window as allocated by the counter 54, though not at the beginning of the window but with a delay of approximately three microseconds. The delay seeks to adjust for a shift in the otherwise synchronous cycle times of the portable units 26 with respect to that of the master unit 25. The delay is predicated on turn-on times of components processing a sync pulse in the portable units 26. In that any of a number of ways may be used to implement synchronous operation between the master unit 25 and the portable units 26, a delay suitable to the described system may not apply to all implementations of the functions described herein. The signal driver 60 may be a state of the art buffer circuit which may drive, for example, a power MOSFET as a preferred switch for turning on a plurality of the LEDs 29 to tranmit the modulated pulse during the selected time slot. Signal quality and over-current protection for the LEDs 29 is provided by a typical current limiting function in the signal driver 60.

Further protection for the LEDs 29 is provided by limiting the duty cycle of the LEDs. A synchronization pulse (sync pulse) is provided at the beginning of each timing cycle originating from the counter 54 during the time slot 41 (see FIG. 5). The sync pulse is applied also through a respective line driver 61 to a sync driver 62. The sync driver applies the sync pulses to LEDs 29a. The LEDs 29a are of the same type as the LEDs 29 but are functionally dedicated to the transmission of sync pulses only. Since the sync pulses are transmitted during each cycle, and always have a duration of the entire time slot 41 without pulse width reduction, the duty cycle for transmitting the sync pulses approximates the duty cycle for transmitting modulated communication signals to the three portable units 26. The modulated communication or information signals are of shorter duration than the sync pulses. The sync driver 62 is identical to the signal driver 60 also including a preferred current limiting circuit as does the signal driver 60.

The master unit 25 receives optical signals over the optical link 30 at the photosensor 28. A signal receiver pre-amplification stage is represented by a pre-amp 64, a switch 65 ("SW 1") and a pre-amp 66. The interposed switch 65 prevents a possible signal overload condition because of leakage from the transmitting LEDs 29 and 29a. It has been found that the magnitude of signals transmitted from the respective unit, when reflected from a nearby surface back to the same unit, far exceeds the magnitude of signals received for recognition via the communication link 30. In the event of such a reflection, the reflected signal fully charges gain controlling by-pass capacitors of the pre-amp stages 64 and 66, overloading and rendering ineffective the pre-amps, and in essence blocking an incoming signal from being recognized by the pre-amps. The switch 65 may be implemented in any of a number of ways, such as by junction field effect transistors. The switch 65 is turned off by either the signal driver 60 or the sync driver 62 during time periods when either the LEDs 29 or 29a are transmitting signals. It should be noted that the isolation of the signal receiver pre-amps 64 and 66 is in addition to selective processing of the received signals only during respective receive time slots, as indicated at 44, 46 and 48 in FIG. 5.

As shown in FIG. 2, the already amplified signals from the pre-amp stage are further amplified by a summing amplifier 67 and by a final amplifier 68. From the final amplifier 68 the signals are applied to a pulse width detector 69. The input to the pulse width detector 69 is also gated and prevents signals from being applied during transmit time slots 41, 43, 45 and 47. The pulse width detector converts the applied signal to a voltage signal having a magnitude corresponding to the pulse width of the applied signal. The voltage signal is gated into one of three physically separated parallel signal paths by one of three switches ("SW 21-23") shown at the switch function 71. The switch function 71 is activated by respective receive time slot signals from the counter 54. The switch function 71 sequentially shifts the final voltage magnitude of signals into a respective one of three parallel sample and hold functions 72. The three signals are passed through a band pass filter stage 74 ("F 21-23") and the output signals from the filters are preferably applied through an output side 75 of a communication interface to the hard wired bus 11. The master unit 25 is protected at the output side of the interface with suitable isolation transformers or by equivalent electronic isolation to transfer the optically received signals at the output terminals or ports 24 to existing communication systems, regardless of existing DC bias voltages. The communication signals, represent in the preferred embodiment voice communications between selected customers and one of three service people, such as bank tellers. The communication signals are in one direction received by the master unit in parallel, translated to serially multiplexed pulse signals and transmitted as discrete optical energy pulses each having a width which is indicative of the instantaneous value of the communication signal. In the other direction, the discrete energy pulses are received from portable units, are amplified and converted to voltage pulses. The voltage pulses are applied to a sample and hold circuit, filtered and transferred to a standard communication system. The functional diagram of FIG. 2 depicts the described functions. It is to be understood that typical, commercially available electrical circuit components of various types may be used to implement the described functions. Electrical power is supplied to the respective circuits in a typical manner.

The Extension Unit

The extension unit 27 is a slave unit to the master unit 25 and is not capable of operating independently of the master unit. In reference to FIG. 2, the master unit 25 shows a signal output leads 77 and 78 from the line driver 59 which allow the signals applied to the signal driver 60 and to the sync driver 62, to be routed as input signals to the extension unit 27. Also shown is a summing signal input lead 79 allowing an output signal from a remote unit to be summed into the summing amplifier 67.

Figure 3:
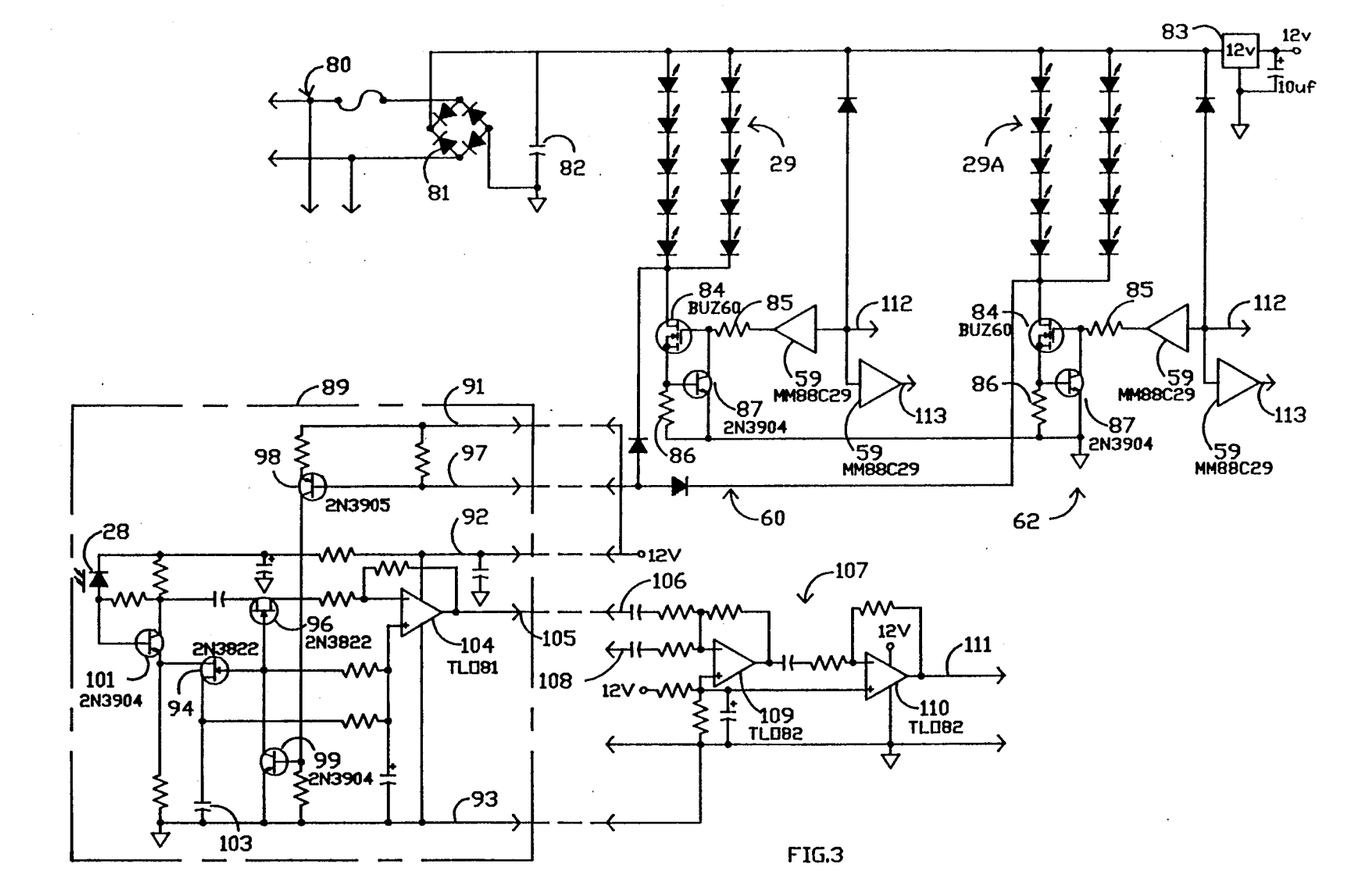
FIG. 3 is a schematic diagram of an extension unit which may be used in conjunction with the master unit for extending an active range of the communication system as shown in FIG. 1.

FIG. 3 shows an electrical schematic diagram of components representing the functions of the extension unit 27. The extension unit 27 does not include the various signal processing functions of the master unit, but includes substantially identical signal transmission and signal reception function. The power supply is based on a 12 volt AC supply source 80. A typical diode bridge full wave rectifier 81 and a 2200 microfarad filter capacitor 82 provide an unregulated 18 volt supply source. Typical voltage regulator circuits, providing, for example, 5 volt and 12 volt sources, may be coupled to the unregulated supply from the rectifier 81. The foregoing implementation is preferred as power supply for the master unit 25. The circuit of the extension unit 27 requires, on the other hand, only a single 12 volt regulated source. Banks of LEDs 29 and 29a, as will be further described, are coupled directly to the unregulated supply 81 to provide sufficient energy for signal transmission.

In addition to FIG. 3, reference may be made to FIG. 2 in the further description of the signal transmission and receiving functions. The LEDs 29 and 29a are arranged in preferred strings of five diodes coupled in series and two of such strings of five diodes 29 or 29a coupled in parallel to the unregulated 18 volt source. Thus, in reference to FIG. 2, the functional representation of single diodes 29 or 29a must be understood as also representing the preferred arrangement of the LEDs 29 and 29a as shown in FIG. 3. Of course, other arrangements are possible, depending on the desired application. However, as described above, 10 of the LEDs 29 (29a) spaced at 36 degree intervals about the periphery of the master unit 25 or the extension unit 27 provide a substantially continuous signal transmission field about the respective units. The driver functions 60 and 62 are preferably identical. In each of the driver circuits 60 and 62, a power field effect transistor, MOSFET 84 is turned on by a positive signal from the respective line driver circuit 59. The current through the MOSFET 84 is limited by measuring the current it conducts, and then lowering the gate voltage of the MOSFET 84 in response to an increasing current flow through the MOSFET 84. The gate voltage signal which drives the MOSFET 84 is applied through an input resistor 85. The positive side of a low resistance power resistor 86, such as 0.3 ohms and 1 watt, in the source leg of the MOSFET 84 is coupled to the base of a transistor 87. The transistor 87 is coupled as a shunt between the gate of the MOSFET 84 and ground. Current regulation is consequently effected by a partial conductance of the transistor 87 when the desired current limit through the MOSFET 84 has been reached.

FIG. 3 further illustrates a preferred embodiment of the pre-amps 64 and 66 and the switch 65. In the preferred embodiment it is contemplated to use essentially identical optical receiver circuits comprising the combination of the photosensor diode 28, the pre-amps 64 and 65 and the switch 65 in the master unit 25. These functions are consequently combined in a separate circuit board module 89, as shown in phantom lines in FIG. 3. The regulated 12 volt supply is applied to the module at 91 and 92 and ground is supplied at 93, respectively. The switching function may be implemented by typical junction field effect transistors ("JFET") 94 and 96, both being switched into a non-conductive mode by a low signal at the terminal 97 because of either the LEDs 29 or the LEDs 29a being turned on to transmit. The JFETs 94 and 96 may be conveniently turned off by a driver circuit of a pnp transistor 98 driving the base current of an npn transistor 99 which in turn drives the bases of the JFETs 94 and 96 low. During the time periods that the JFET switches 94 and 96 are not driven into non-conductive states, optical signals received by the photosensor diode 28 are amplified in an initial stage by the gain of a transistor 101. The JFET 94 protects the emitter capacitor 103 from becoming overloaded by reflected signals from the LEDs 29 and 29a of the respective units, such as the extension unit 27 in the instant case. Hence the JFET 94 effectively disables the gain of the transistor 101. The pre-amplified signal at the collector terminal of the transistor 101 is applied to a typical amplifier circuit 104 for the second stage of pre-amplification as described in reference to FIG. 2 with respect to the pre-amp function 66. Corresponding to the function of the JFET 94 with respect to the first stage of pre-amplification, the JFET 96 protects the amplifier circuit 104 from reflected transmission signals from the same unit. The JFET 96 blocks any already non-amplified signal from being applied to the second stage of pre-amplification, represented by the amplifier circuit 104. The output from the amplifier 104 is applied via coupling terminal 105 to a first input terminal 106 of a summing signal driver 107. The signal driver 107 may combine the received optical signal, as amplified by the described pre-amplification circuit 89 with another pre-amplified signal at an input terminal 108 from another extension unit (not shown) which may be coupled to the typical extension terminal 108, also shown in FIG. 1. A typical amplifier circuit 109 as shown in FIG. 3 inverts the summed signals. However, the summed signals must be compatible with all other signals added either into a similar summing amplifier circuit 109 of another extension unit 27 or with the correspondingly amplified signal applied from the pre-amp 66 to the summing amplifier 67. Consequently, the summing amplifier circuit 109 is followed in the preferred example with an inverter-amplifier circuit 110. To further process the received signal from the extension unit 27, an output signal from a terminal 111 of the circuit 110 may, consequently, conveniently be fed directly into the summing input lead 79 of the master unit 25. When more than one extension unit 27 is desired, according to the preferred embodiment, additional ones of the extension units may be linked in a series chain, whereby the terminal 111 is coupled to the summing terminal 108 of another extension unit 27 which ultimately couples its unit to the master unit 25. The transmit signals from the master unit, corresponding to data and sync pulses, respectively, are coupled into corresponding input terminals 112 of the respective line drivers 59. The same coupling process is used to serially link the input data and sync pulses, again through respective line drivers via output terminals 113 to the next subsequent extension unit (not shown) in the chain.

The Portable Unit

In contrast to the master unit 25 and extension units 27 which are preferably hard-wired to a net of AC power, the portable units 26 are preferably battery-operated. Power conserving functions were found necessary to be included in the portable units 26 for extending the service life of the batteries between typical power replenishments, such as by replacement of or by recharging the batteries. These power conserving functions are consequently not needed in the hard-wired master unit 25 and in any of the extension units 27. On the other hand, the portable units 26 receive and transmit signals only during their respective designated time slots and are in that respect more simple in the processing of received and transmitted data.

Figure 4:
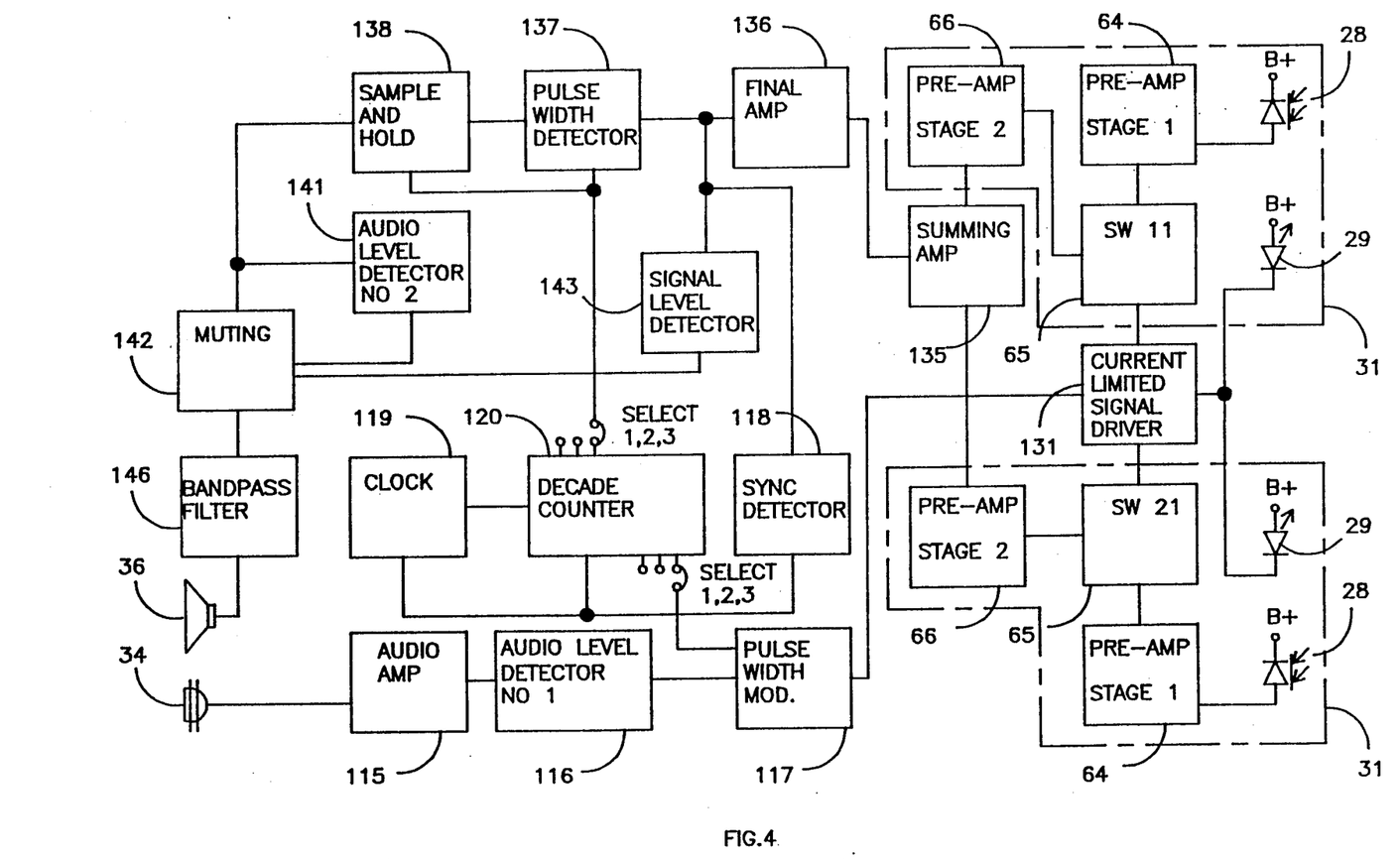
FIG. 4 is a functional diagram of a portable optical communication unit optically coupled to the master and extension units as shown in FIG. 1.

The functional block diagram of FIG. 4 illustrates the functions of the portable unit 26. The microphone 34 is coupled to typical audio amplification represented by the function 115 ("AUDIO AMP"). Combined into the audio amplification are such typical elements, for example, as a band pass filter, or a DC bias circuit for a condenser type microphone. It is understood that the actual circuit representing the initial amplification 115 of the speech-equivalent electrical signals may be modified to adapt the input to the respective type microphone 34. The amplified output signal from the audio amp 115 is applied to an audio level detector 116 ("AUDIO LEVEL DETECTOR 1"). To conserve battery power, the signal processing circuits of the transmitter branch are preferably turned off during periods when signals of a minimum level are not received. The level detector turns on the transmitter for a preferred short period, such as 150 milliseconds, which is however many times longer than the described sampling period of 140 microseconds. Any further sampled signals of sufficient strength during the turn-on time extend the turn-on period by the preferred period past the last detected signal. The signals are applied to a pulse width modulator 117 which in essence is identical to the pulse width modulator function 57 of the master unit 25. As with the master unit 25, the portable unit 26 generates time slots corresponding to the time slots of the master unit. A sync pulse is not generated or sent out by the portable unit 26 as it has been described with respect to the master unit 25. Instead, the timing cycles of the portable units 26 are controlled by the master unit 25 and are synchronized by the sync pulse of the master unit 25. A sync pulse detector 118 ("SYNC DETECTOR") is coupled to a processing path of received signals and identifies received pulses having a width or duration beyond that of modulated pulses which are representative of sound aplitudes. When such a "long" pulse is detected, the sync detector 118 sends a reset pulse to a cycle clock and a decade counter 119 and 120, respectively. The clock and time slot counter 119 and 120 are reset by the recognized pulse from the master unit 25, and the time slots of the portable units 26 are thereby brought into synchronization with the allocated time slots of the master unit.

Figure 6:
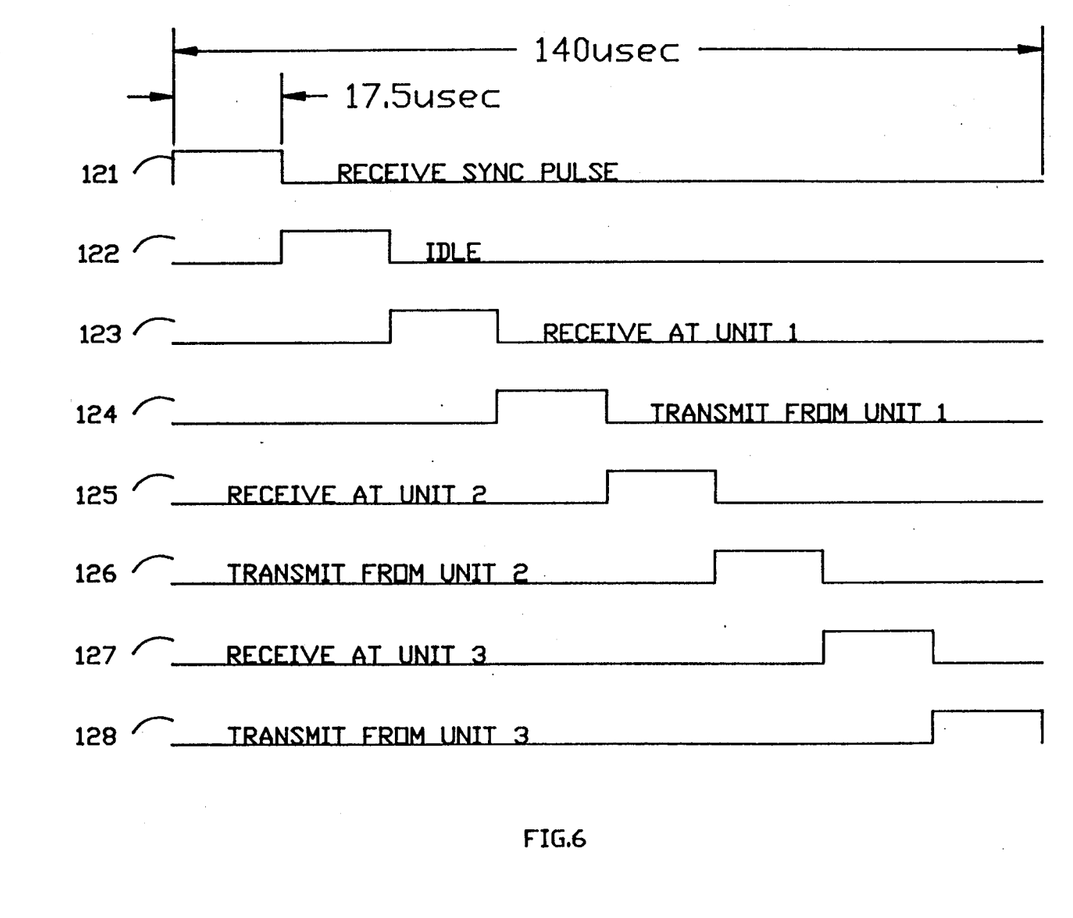
FIG. 6 is a timing diagram of the portable unit schematically shown in FIG. 4.

The counter 120 is compatible in time slot allocations with the counter 54 of the master unit 25. In reference to FIGS. 5 and 6, the time slots 121 through 128 shown in the timing diagram of FIG. 6 sequentially designate time slots which are complementary to the time slots of the master unit 25 illustrated in FIG. 5. Starting with a first time slot 41 for transmitting the sync pulse, the corresponding time slot 121 is allocated to receive the sync pulse. The portable units 26 act in response to the receipt of the sync pulse from the master unit 25 to reset the clock 119 and the counter 120. The second period is an idle period in both units which may be used to synchronize the clock pulse after reset and to initiate the clocking of the remaining time slots. The cycle of time slots of the portable units 26 as being synchronized by the sync pulse once at the beginning of each cycle may consequently be referred to as a "sync cycle". The remaining six data time slots 123 through 128 are also complementary to the data time slots 43 through 48 of the master unit 25. For example, the first data time slot 43 is a first time slot for transmitting from the unit 25 to a first one of the units 26. Correspondingly, the first data time slot 123 is designated "RECEIVE AT UNIT 1". The second data time slot 44 of the master unit 25 is designated "RECEIVE FROM UNIT 1". The corresponding second data time slot 124 is correspondingly designated "TRANSMIT FROM UNIT 1", for the first portable unit 26 to transmit to the master unit 25.

Referring back to FIG. 4, since the counter 120 provides time slot allocations for three of the portable units 26, each portable unit 26 would be programmed for or designated as one of the three units in the optical communication system 12, as indicated by the function "SELECT 1,2,3".

Physically, a jumper or switch may be used to implement the selection of the first, second or third sets of time slots. The portable unit 26 becomes thereby programmed to be functional only during the respective transmit and receive time slots. Hence the pulse width modulator 117 is activated during the respective transmit period. The signal from the pulse width modulator 117 is applied to the signal driver 131 and the LEDs 29 transmit the signal for the duration of the pulse. In accordance with the preferred embodiment, each of the LEDs 29 shown in FIG. 4 again represent a bank of such diodes which are strung in series. The LEDs 29 in each string are physically arranged to radiate photo energy over a substantially semicircular arc, keeping in mind that each of the cases 31 and 32 include such an arrangement such that there exists a full circular coverage of optical transmission. It is further noted that a sync pulse is not transmitted by the portable units 26. Hence, in the portable units 26 the separate bank of LEDs 29a are not required. The LEDs of the portable units actually have a more favorable duty cycle in that there is only one transmission time slot during each clock cycle.

Both of the cases 31 and 32 include a receiver module substantially as the described receiver module 89 (see also FIG. 3). Accordingly, the optical signal is received by the photosensor diodes 28, is amplified as previously described with a first stage pre-amp 64 and a second stage pre-amp 66, the described switch 65 being activated to block reception of optical signals during the transmission by the respective portable unit 26. The switches 65 in each of the cases 31 and 32 are operated to block reception by the signal driver 131. It is also convenient to electrically couple the LEDs 29 in each of the cases 31 and 32 across, for example, the terminals 91 and 97. Such coupling energizes the LEDs on the negative going pulse which also opens the respective switches 65 ("WS 11") of each of the cases 31 and 32.

The amplified received signals from each of the cases 31 and 32 are summed in a summing amplification 135 and are applied to a final amplifier stage 136 ("FINAL AMP") similar to the final amplifier 68 of the master unit 25. The summing amplifier 135 and subsequent logic common to both cases 31 and 32 preferably would be physically mounted in the common housing or case 33. The case 33 preferably also includes the battery, electrical power from the battery being routed via typical bus connection to the cases 31 and 32 as indicated by the symbols "B+", for example. The signals from the final amplification stage 136 are applied to a pulse width detector 137 and then to the sample and hold function 138. The pulse width detector 137 converts the width or duration of the voltage signal to a voltage signal having a voltage magnitude which corresponds to the duration of the converted pulse. The voltage magnitude is locked in by the sample and hold function 138 until updated when the next voltage signal is applied during the next following timing cycle.

An audio level detector 141 ("AUDIO LEVEL DETECTOR 2") detects the absence or presence of an audio signal at the signal output side of the sample and hold function 138. The audio level detector 141 may be substantially identical in components and function to the audio level detector 116 coupled into the transmit path. Both audio level detectors 116 and 141 support a function of switching off the signal path when no audio signal is detected. The switching function of the audio level detector 116 is described as part of the function of detecting and turning on the normally deactivated transmit path. The switching function of the audio level detector 141 is shown separately from a muting function 142. The muting function 142 may be implemented, for example, by shunting the signal output of the sample and hold circuit to the signal ground, also referred to as AC ground. A typical timing function is included in the muting function 142, to allow the muting function to remain turned off for a predetermined time period after a signal has been detected. A convenient time period has been found to be 150 milliseconds, allowing at least one thousand sampling cycles before the muting function is turned on again. The muting function 142 will, however, remain turned off as long as a recognizable signal level is continued to be detected.

The muting function 142 may also be activated to turn off the output in the signal receiving path when a significant loss of signal strength of the received signal is detected. The received signal is an optical pulse of a certain strength or "brightness" and of a predetermined pulse width or duration. When after amplification of the received signal a pulse strength or amplitude fails to exceed a predetermined threshold and is not detected by the signal level detector 143, the muting function 142 is also activated to mute the output signal from the sample and hold function 138. The purpose of the signal level detector 143 is to cut off signal reception when a low level of the signal may prevent interpretation of the pulse width value of the signal and introduce noise into the headset speaker 36. The muting function 142 may consequently be activated either by the absence of transmitted information, such as voice signals, or by the absence of sufficient signal strength to interpret the transmitted information correctly.

Once the signals processed in the described manner pass the muting function 142, they are applied to typical audio signal filtering as indicated by a filter block 146 ("BAND PASS FILTER"). It should be kept in mind that the selection of signal filter components is to a certain degree one of choice. For example, the function comprising the band pass filter 146 may include a commercially available active "low pass" filter arrangement followed by a second band pass filter arrangement having high and low roll off characteristics including what is known as level matching. The filtered communication signals are subsequently applied to the headset speaker 36.

The Pulse Width Detector Circuit

Figure 7:
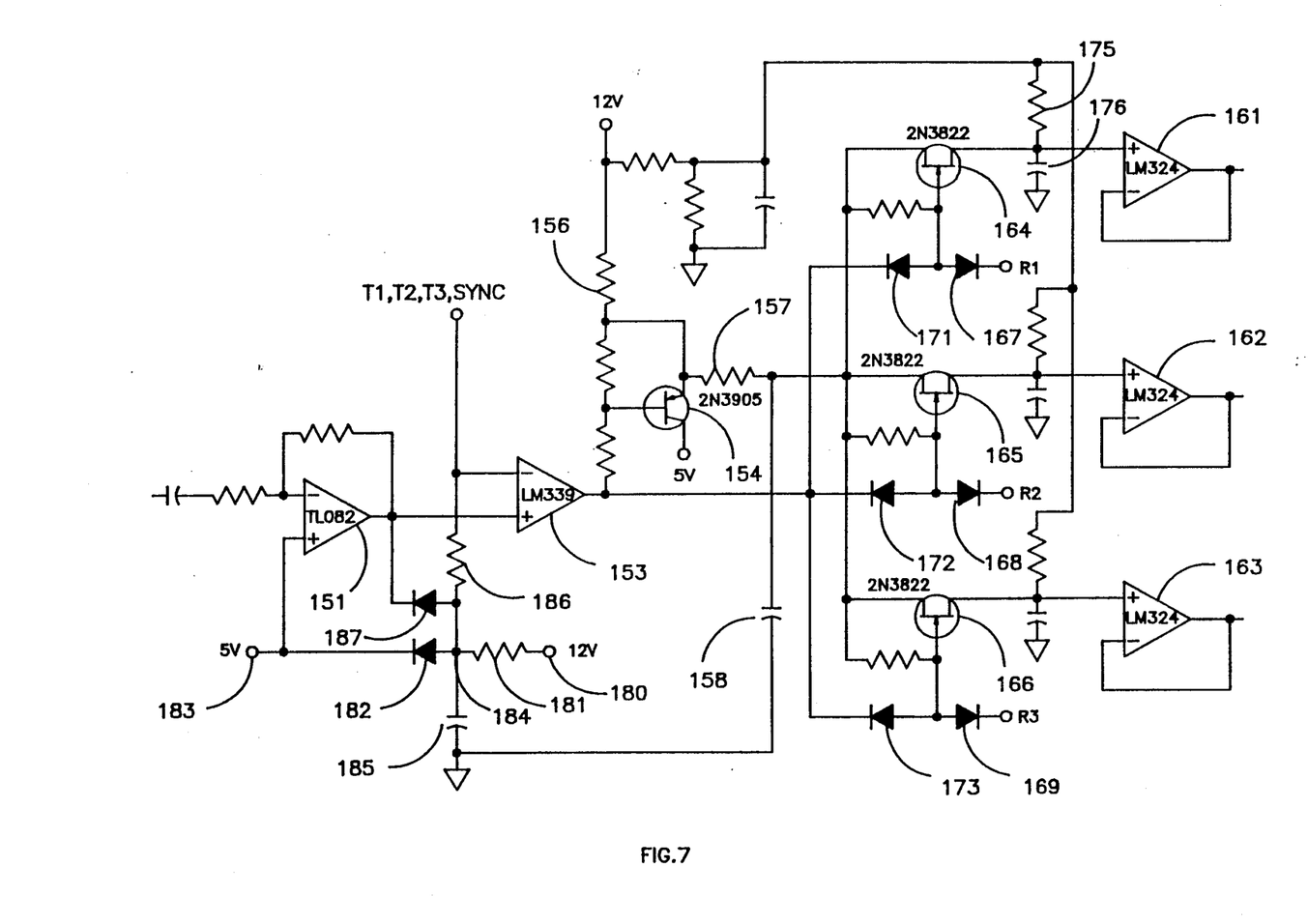
FIG. 7 is a schematic electrical diagram of a preferred pulse width detector and sample and hold circuits.

A particular manner of implementing the function of the pulse width detectors 69 and 137 of the master unit 25 and of the portable unit 26 is best described in reference to the schematic diagram in FIG. 7. The final stage of amplification is shown as an example by an amplifier 151. The output of the amplifier 151 is coupled to the non-inverting terminal of a comparator 153. The inverting terminal of the comparator 153 is the reference terminal which is desirably biased above the normal DC bias reference of the output from the amplifier 151. Consequently, in the absence of a signal from the amplifier 151, the output of the comparator 153 remains at ground. When a signal is applied to the non-inverting terminal of the comparator 153, the output of the comparator is switched open and is no longer at ground. In the described example of the pulse width detector 69, the signal detection by the comparator 153 is desirably used to start a voltage ramp which continues to increase in magnitude for the duration of the pulse. The voltage may then be sampled and the maximum value be locked in by the sample and hold function 72 (see FIG. 2).

Again in reference to FIG. 7, when the output of the comparator 153 switches from ground to open in response to the detection of a signal, a switch, such as a normally conducting pnp transistor 154 is switched off. When the transistor 154 is off, current flows through a charging resistor 156 and through a second resistor 157 into a capacitor 158 to charge the capacitor. It should be noted that the supply voltage applied to the resistor 156 in the described example is at a first, high level, such as 12 volts while the collector bias voltage of the transistor 154 is at a second, lower voltage above ground, such as 5 or 6 volts, for example. The capacitor is coupled directly to ground. The voltage on the capacitor 158 may consequently vary between the lower and higher voltages, such as between 5 volts and 12 volts. When the presence of the signal is no longer detected by the comparator 153, the comparator output again switches to ground. The base voltage of the transistor 154 is drawn low and the transistor again becomes conductive, discharging the capacitor 158 through the second resistor 157. A value for the charging resistor 156 may be, for example, a resistance of 2.2K ohms, for the second, discharge resistor 157 a resistance of 100 ohms, and for the capacitor 158, a capacitance of 0.01 microfarad. The discharge time of the capacitor is consequently approximately one-twentieth of the charging time.

The ramped voltage corresponding to the voltage on the capacitor 158 may be sampled by one of the three referred-to channels corresponding to the respective communication channels or time slots (see second data time slots 44, 46 and 48 in FIG. 5) from the three portable units 26. Consequently, in the depicted diagram of FIG. 7, the ramped voltage may be applied to the non-inverting input terminal of a selected one of three operational amplifiers 161, 162 and 163. The selection of the amplifiers is made by switching on a respective one of three corresponding switches, in the preferred example JFETs 164, 165 and 166. Respective diodes 167, 168 and 169 are coupled to retain the gate terminals of the JFETs 164, 165 and 166 low and biased into a non-concuctive state whenever there is no input from the counter 54 during an enabling time slot. In addition, the respective JFETS will remain biased off unless a signal is detected by the comparator 153, such that the output terminal of the comparator is floated substantially to the voltage on the capacitor 158. Thus, when a time slot signal is applied to the gate of one of the JFETs and a signal is detected by the comparator 153, the respective one of the JFETs will remain conductive until either of these conditions for conductance cease.

As contemplated, the trailing edge of the pulse is reached well within the respective time slot. As soon as the signal pulse disappears the output terminal of the comparator 153 goes to ground, turning off the respective JFET switch 164, 165 or 166. The JFET being rendered non-conductive locks the latest voltage sensed from the ramped voltage into the respective amplifier 161, 162 or 163. The voltage will substantially remain there until the next sampling pulse again activates the respective JFET to update the voltage information locked into the amplifier. To avoid an uncontrolled drifting of the locked in voltage when no sampling pulse is received over long periods of idle time, a bias voltage is applied through a comparatively long time constant (desirably 1000 times the sampling period) to each of the non-inverting inputs of the respective amplifiers 161, 162 and 163. This causes the non-inverting terminal to gradually drift to a preselected voltage which is chosen to be essentially a median bias voltage about which the voltage signal is modulated. The bias voltage is applied through resistors 175 into capacitors 176, for example. In the preferred example, the preferred median voltage is about six volts with an average modulation of 100 millivolts with respect to the median. The time constant is chosen by the charging resistor 175 having a preferred resistance of 15 megohms and the capacitor 176 having a capacitance of 0.001 microfarads. With the preferred time constant and at the preferred cycle rate for sampling sensed signals, the voltage signals locked into the sample and hold amplifiers 161, 162 and 163 remain essentially stable between successive updates.

A problem of signal loss or distortion may occur as the result of the bias drift of the output from the final amplification stage depicted by the amplifier 151. A strong positive input signal will drive the DC bias at the output from the amplifier 151 toward the negative. The signal will slowly recover to a normal bias level. However, until such recovery has occurred, the comparator 153, if referenced to a certain bias voltage, might be unable to detect signals when referencing the signal pulses to a fixed voltage reference. A floating reference voltage with a preselected time constant for following the bias recovery of the output from the amplifier 151 has been chosen to overcome the risk of possibly losing signals following a substantial signal load on the signal amplification function.

The reference voltage bias circuit in FIG. 7 shows a relatively high voltage source 180, such as an available 12 volt source. The source 180 is coupled through a resistor 181 and a first, forward biased diode 182 to a, compared to the source 180, relatively low voltage source 183 above ground, such as an available 5 or 6 volt source. A node 184 between the resistor 181 and the diode 182 is coupled through a capacitor 185 to ground. A resistor 186 of desirably about ten times the value of the resistor 181 is coupled between the node 184 and the inverting or reference input terminal of the comparator 153. The resistor 181 is intended to limit current flow from transmit timing signals from the decade counter applied to the inverting terminal of the comparator 153 to significantly affect the charge on the capacitor 185. A second diode 187 is coupled in a forward biased direction between the node 184 and the output of the amplifier 151.

During normal operation of the described circuit, the node 184 and, hence, the inverting reference terminal of the comparator 153 is at one voltage drop of the forward biased diode 182 above the lower voltage source, such as 5.5 volts versus 5 volts for the lower voltage source. The normal, no signal bias of the output of the amplifier 151 lies at 5 volts, or one forward bias voltage drop below the reference voltage at the node 184. Except when the counter applies a 12 volt bias to the reference terminal of the comparator 153 to bias its output to ground, there is in essence no current flow across the resistor 186. When a normal signal pulse appears on the output of the amplifier 151, the pulse is applied to the non-inverting terminal of the comparator 153 and is processed accordingly. When a load on the amplifier 151 resulting from a strong signal drives the bias voltage at the output of the amplifier 151 downward to an extent that signal pulses might not be recognized by the comparator 153 until after the circuit has recovered from the shift in bias voltage, the described circuit compensates. The second diode 187 conducts current in response to the sudden drop in bias voltage at the output of the amplifier 151. Consequently, the voltage at the node 184 and also at the inverting reference terminal of the comparator 153 is pulled down to one diode drop above the downward shifted bias voltage at the output from the amplifier 151. As the output bias voltage of the amplifier 151 recovers from the sudden bias voltage drop, the voltage at the node 184 ideally follows the rise in the amplifier bias voltage. The RC time constant of the resistor 181 and the capacitor 185 is consequently chosen to substantially follow the recovery curve of the output voltage from the amplifier 151. In the described manner the comparator 153 is capable of recognizing signal pulses in spite of changes in the bias voltage of the amplified signal pulses as applied to the non-inverting terminal of the comparator 153.

The description in reference to FIG. 7 pertained in the selective activation of the JFET switches 164, 165 and 166 particularly to the master unit 25 as a more complex circuit relative to that of the portable unit 26. The corresponding pulse width detection function of the portable unit 26 is implemented in a substantially identical manner, except that only a predetermined single time slot (selected, for example, from the first data time slots 123, 125 and 127) is used to activate a single JFET switch in the same manner as described for the exemplary three switches 164, 165 and 166.

The Pulse Width Modulator

Figure 8:
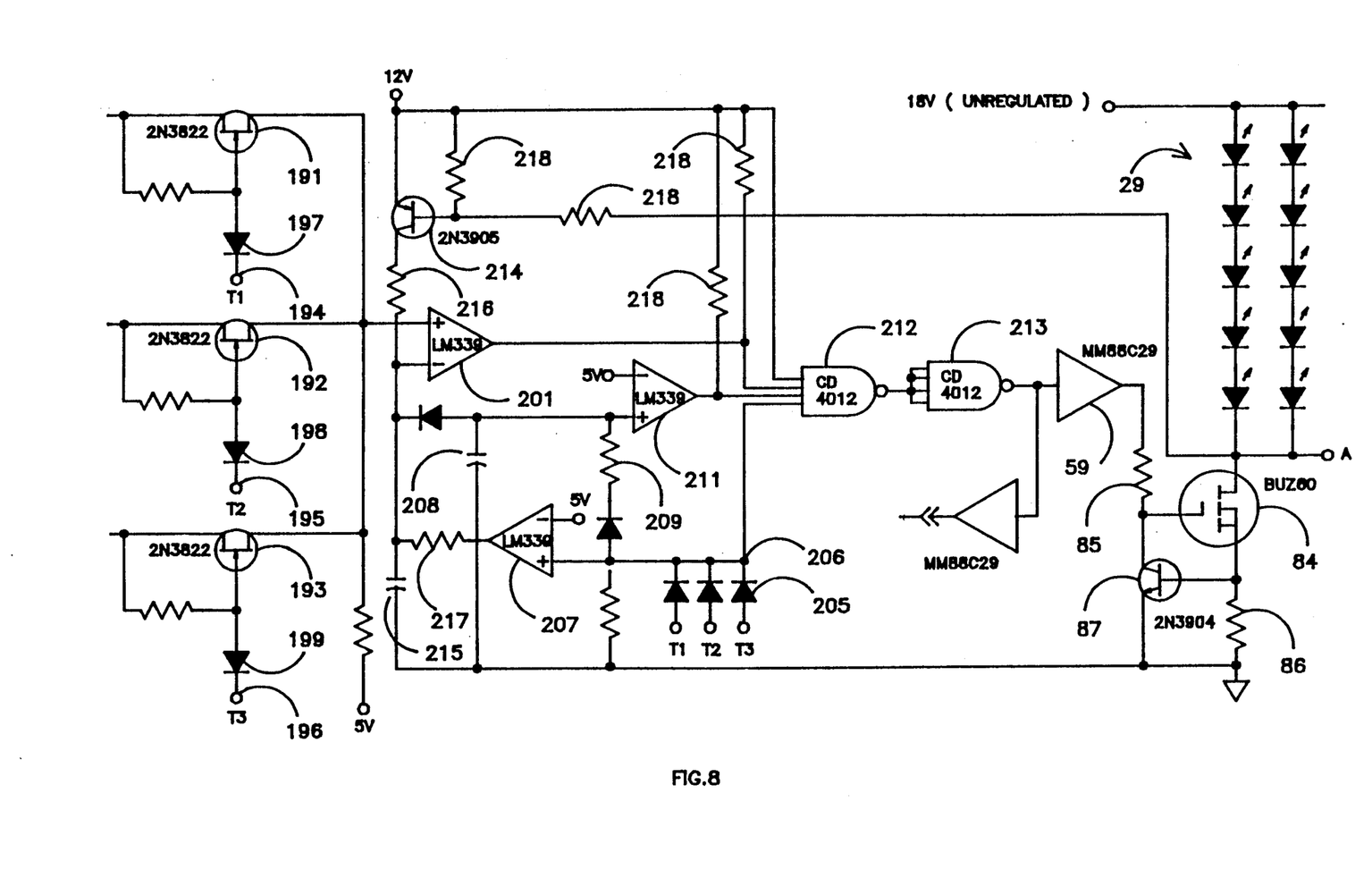
FIG. 8 is a schematic electrical diagram of a preferred pulse width modulator.

FIGS. 2, 5 and 8 may be referred to for a description of an implementation of the pulse width modulator function 57 of FIG. 2. Three JFET analog switches 191, 192 and 193 (SW 11-13) are selectively closed in response to respective positive time slot signals from the counter 54 appearing at the terminals 194, 195 and 196. When any one of the switches 191, 192 or 193 is closed, a voltage signal is passed by the respective closed switch and is applied to a non-inverting terminal of a comparator 201. Simultaneously with closing one of the JFET switches, the same time slot transmit signal, 12 volts in the described example, is applied through one of the respective diodes at 205 to the node 206. The high signal at the node 206 turns off a comparator 207 and also starts to charge a capacitor 208 through a charging resistor 209. The time constant of the capacitor 208 and the resistor 209 is chosen to provide the described delay 58 (see FIG. 2) of approximately three microseconds from the beginning of the respective transmit time slot before the transmission of a modulated pulse is initiated. The delay corresponds to the time required to bring the voltage at the non-inverting terminal of a comparator 211 to a value greater than a reference voltage of a preferred 5 volts applied to the inverting terminal of the comparator 211. At the end of the delay period the comparator 211 is switched off and all input terminals to a NAND gate 212 have now become positive, such that the output of the gate 212 switches to a low signal. The low signal is inverted by an inverter component 213 and is applied through the line driver 59 to the signal driver 60. The operation of the signal driver 60 is described in greater detail with respect to the description of FIG. 3. A low signal appearing in response to the turn-on of the MOSFET 84 at the drain of the MOSFET is applied to the base of a pnp transistor 214 to render the transistor 214 conductive. A capacitor 215 begins to charge through a charging resistor 216. The time constant or the resistor 216 and the capacitor 215 determines is preferred to be 6.8 microseconds. The time constant determines a typical pulse width in that the voltage to which the capacitor is charged is applied to the inverting terminal of the comparator 201. When the capacitor voltage of the capacitor 215 exceeds the signal voltage, the output of the comparator goes low, switching the NAND gate 212 and thus ultimately turning off the MOSFET 84, thereby terminating the period of transmission of the pulsed signal. At the end of the time slot the comparator 207 is switched on and the capacitors 215 and 208 discharge through the resistor 217. Other resistors 218 shown in FIG. 8 are typical biasing or current limiting resistors of the described circuit.

The above pulse width modulator circuit has been described as one way of implementing the respective functions described in FIG. 2. The pulse width modulator function 117 may be implemented in a substantially similar manner by a person skilled in the art at hand of the above description. It should be remembered, however, that the transmission of pulses from the portable units 26 to the master unit 25 need not be and should not be delayed. Consequently, the selected transmit time slot signal from the counter 120 (see FIG. 4) of the portable unit 26 may be applied directly to the gate and not through the described delay 58. The corresponding circuit of the portable unit 26 is also less complex in that signals are processed during only one selected time slot in each sync cycle of the portable units 26.

It should be understood that within the scope of disclosure, changes and modifications in the structure of the described embodiment are possible without departing from the spirit and scope of the invention as described herein.

What is claimed is:

1. A pulsed communication system comprising:
   means for generating consecutive cycles, each cycle defining a plurality of sequential time slots including a plurality of first data time slots and a plurality of second data time slots;
   a plurality of first communication units each first unit including a communication port having an input and an output terminal and means for receiving from the input terminal a communication in the form of first type signals and for transferring to the output terminal a communication in the form of first type signals, means for converting the received first type signals to a sequence of pulses and for transmitting the converted first type signals as pulsed signals, one pulse during each cycle and during a predetermined one of the second data time slots thereof, means for receiving pulsed signals, one pulse during each cycle and during a predetermined one of the first data time slots thereof, and means for converting the received pulsed signals to first type signals and for transferring the received pulsed signals as first type signals to the output terminal of each first communication unit; and
   a master unit including an interface having a plurality of separate input and output ports, means for receiving from each input port a separate communication in the form of said first type signals and for transferring to each output port a separate communication in the form of said first type signals, means for converting the received first type signals to a sequence of pulses and for transmitting the converted first type signals as pulsed signals, one pulse of each separate communication during a predetermined first data time slot of each cycle to correspond to a predetermined first data time slot for receipt of said pulse by a designated one of said first units, and means for receiving a plurality of separate communications independently of each other from the first communication units in the form of said pulsed signals, one pulse of each separate communication during a predetermined second data time slot indicative of transmission from a predetermined one of the first units, means for converting said pulsed signals to separate communications of first type signals and for transferring the separate communications to a predetermined one of the output ports.

2. The system according to claim 1, wherein the system is an optical, pulsed system and the means of the first units and of the master unit for transmitting pulsed signals comprises light emitting diodes, and the means of the first units and of the master unit for receiving pulsed signals comprises photosensor diodes.

3. The system according to claim 2, wherein the system further includes at least one extension unit electrically coupled to the master unit for extending effective optical transmission and reception ranges of the master unit.

4. The system according to claim 1, wherein the means for generating consecutive cycles of a plurality of sequential, timed signals comprises a clock and counter disposed in each of the first units and in the master unit, the master unit further comprising means for generating and transmitting a sync pulse during an initial time slot in each cycle and each of the first units comprises means for receiving said sync pulse and for synchronizing the clock and counter of the respective first unit in response thereto.

5. The system according to claim 4, wherein the first and second data time slots are alternately arranged in a sequence in which each second data time slot follows one of the first data time slots in each cycle.

6. The system according to claim 4, wherein a second time slot in each cycle following the initial time slot in each cycle is an idle time, said idle time following the transmission by the master unit of the sync pulse and preceding the first and second data time slots.

7. The system according to claim 6, wherein the plurality of first units are three first units, and each such cycle of timed signals defines eight time slots, including said initial time slot for transmission and reception of said sync pulse, said second time slot corresponding to said idle time, and three first and second data time slots following said idle time.

8. The system according to claim 6, wherein the system is an optical, pulsed system and the means of the first units and of the master unit for transmitting pulsed signals comprises light emitting diodes, and the means of the first units and of the master unit for receiving pulsed signals comprises at least one photosensor diode in each of the units.

9. The system according to claim 8, wherein the master unit comprises means for delaying the transmission of the pulsed signals by a predetermined period within the respective first time slots, the period corresponding to a period by which the synchronized cycle of the first units is delayed with respect to the cycle of the master unit.

10. The system according to claim 8, wherein the light emitting diodes of the master unit are spaced circumferentially about the master unit to transmit the pulsed signals substantially equally in all directions with respect to the master unit, and wherein the means of the master unit for generating and transmitting a sync pulse includes a plurality of circumferentially spaced light emitting diodes separate and distinct from the light emitting diodes for transmitting the pulsed signals.

11. The system according to claim 8, wherein the means of the first units and of the master unit for receiving pulsed signals comprises a pre-amp coupled to the photosensor diode, and a switch operated during transmission of pulsed signals from the respective first units and master unit for blocking the received pulsed signals from being amplified upon being received by the photosensor diodes of the first and master transmitting units.

12. The system according to claim 11, wherein the system further includes at least one extension unit electrically coupled to the master unit and spaced from the master unit for extending effective optical transmission and reception ranges of the master unit, said extension unit including means for transmitting the converted first type signals as pulsed signals, one pulse of each separate communication during a predetermined first data time slot of each cycle to correspond to a predetermined first data time slot for receipt of said pulse by a designated one of said first units, and means for receiving a plurality of separate communications independently of each other from the first communication units in the form of said pulsed signals, one pulse of each separate communication during a predetermined data second time slot indicative of transmission from a predetermined one of the first units, said receiving means of said extension unit including a pre-amp coupled to a photosensor diode, and a switch operated during transmission of pulsed signals from said extension unit for blocking such pulsed signals from being amplified upon being received by the photosensor diode of said extension unit.

13. The system according to claim 11, wherein the first units comprise means for detecting the strength of the received pulsed signals relative to a predetermined threshold, and means, operative in response to a detected absence of a signal exceeding the predetermined threshold, for disabling the means for transferring the received pulsed signals as first type signals to the output terminal of such first communication units.

14. The system according to claim 13, wherein the first units comprise means for detecting the presence of communicated information in the received pulsed signals, and means, operative in response to a detected absence of communicated information in the received pulsed signals, for disabling the means for tranferring the received pulsed signals as first type signals to the output terminal of such first communication units.

15. The system according to claim 14 wherein the first units comprise first, second and third cases, both the first and second cases comprising said light emitting diodes, said pre-amp and said photosensor diode.

16. A pulsed optical communication system including a master unit and a plurality of individual units, each individual unit to communicate with the master unit independently of any other individual unit over a common optical transmission link, the system comprising:

means for synchronizing the individual units and the master unit to operate on a time cycle having a plurality of time slots, the time slots including first type time slots for communication of a single data pulse per time slot during a designated first type time slot from the master unit to a respectively designated one of the individual units, and second type time slots for communication of a single data pulse per time slot during a designated second type time slot from a designated one of the individual units to the master unit;

the master unit including signal input means for accepting simultaneously a plurality of distinct messages of first type signals, each of the messages designated to be communicated to a selected one of the individual units, means for converting during respective ones of the first type time slots the first type signals to pulse width modulated pulsed signals, and means for transmitting the pulsed signals optically, one pulse during each respectively designated ones of the first type time slots of each time cycle for reception by a respectively designated one of the individual units, the master unit further including means for receiving during designated ones of the second type time slots pulse width modified optically pulsed signals from respectively designated ones of the individual units, means for converting the received pulsed signals to the first type signals, a plurality of distinct output means for simultaneously communicating the converted first type signals as a plurality of distinct messages independently of each other at each of the output means, and means for selectively applying the converted first type signals to respective ones of the output means in accordance with the receipt of the pulsed signals during a designated one of the second type time slots; and each of the individual units including means for converting during a designated one of the second type time slots messages of the first type signals to pulse width modulated pulsed signals, and means for transmitting the pulsed signals optically, one pulse each during a designated one of the second type time slots of each time cycle for reception by the master unit, means for receiving from the master unit optically pulsed signals, a single pulsed signal during each designated one of the first type time slots in each time slot, and means for converting the received pulsed signals to a message of first type signals.

17. The system according to claim 16, wherein the means for synchronizing the individual units and the master unit comprises means for generating and transmitting a sync pulse at the beginning of each cycle, the sync pulse generating means disposed in the master unit, and means disposed in each of the individual units for receiving the sync pulse and for synchronizing the time cycle of first and second type time slots to the sync pulse; and wherein the master unit includes means for delaying the transmission of each of the pulsed signals transmitted during the first type time slots by a predetermined time period with respect to the beginning of each respective time slot.

18. The system according to claim 16, wherein the first type signals are electrical analog signals, and the means for converting the analog signals to pulse width modified pulsed signals comprises means for sampling during a designated time slot of each cycle the magnitude of a designated one of the analog signals and for converting the sampled magnitude into a pulse width modulated electrical signal.

19. The system according to claim 16, wherein the means for synchronizing the individual units and the master unit comprises means for generating and transmitting a sync pulse at the beginning of each cycle, the sync pulse generating means disposed in the master unit, and wherein the means for transmitting the sync pulse comprises optical transmission means separate from the means in the master unit for transmitting the pulsed signals optically.

* * * * *